United States Patent
Gutierrez et al.

(10) Patent No.: US 11,488,220 B1
(45) Date of Patent: Nov. 1, 2022

(54) NETWORK-BASED AGE VERIFICATION METHOD

(71) Applicant: BankCard USA, Westlake Village, CA (US)

(72) Inventors: Ricardo Andres Alvarez Gutierrez, Fort Walton Beach, FL (US); Matthew Fields, Westlake Village, CA (US); Nicolas W. T. Jabbour, Westlake Village, CA (US)

(*) Notice: Subject to any disclaimer, the term of this patent is extended or adjusted under 35 U.S.C. 154(b) by 64 days.

(21) Appl. No.: 17/233,972

(22) Filed: Apr. 19, 2021

Related U.S. Application Data

(63) Continuation-in-part of application No. 15/273,646, filed on Sep. 22, 2016, now Pat. No. 10,984,458.

(51) Int. Cl.
   G06Q 30/00 (2012.01)
   G06Q 30/06 (2012.01)
   G06F 16/2457 (2019.01)

(52) U.S. Cl.
   CPC ... *G06Q 30/0607* (2013.01); *G06F 16/24573* (2019.01); *G06Q 30/0609* (2013.01); *G06Q 30/0613* (2013.01)

(58) Field of Classification Search
   None
   See application file for complete search history.

(56) References Cited

U.S. PATENT DOCUMENTS

| | | | | |
|---|---|---|---|---|
| 8,620,666 | B1* | 12/2013 | Whitmore | G10L 17/00 704/246 |
| 2009/0187417 | A1* | 7/2009 | Lidestri | G06Q 10/10 705/317 |
| 2017/0272418 | A1* | 9/2017 | Kim | H04L 63/08 |

OTHER PUBLICATIONS

Mackey, Tim K., Exploring the e-cigarette e-commerce marketplace: Identifying Internet e-cigarette marketing characteristics and regulatory gaps, Sep. 26, 2015, Drug and Alcohol Dependence, vol. 156, pp. 97-103 (Year: 2015).*

\* cited by examiner

*Primary Examiner* — Jeffrey A. Smith
*Assistant Examiner* — Timothy J Kang
(74) *Attorney, Agent, or Firm* — Peter Loffler

(57) ABSTRACT

A method whereby the date of birth (age) of a customer engaging in e-commerce over the Internet is verified. The present invention is launched from a merchant's website when an age sensitive transaction—alcohol or tobacco purchase, access to an adult web site, etc.,—is being undertaken. The system first checks to see if the customer is a known entity with a known date of birth. If the customer is not appropriately known to the system, then the system checks public records from information supplied to the system by the customer. If the date of birth is still unknown after such a check, the customer uploads an image of photo identification which is checked for date of birth either via software and also a selfie holding the identification. Optional SMS code verification can be undertaken. E-signatures can be optionally collected. Once the date of birth is known, the transaction is approved or denied based on the totality of the facts of the transaction.

17 Claims, 4 Drawing Sheets

NETWORK-BASED AGE VERIFICATION METHOD

This application is a Continuation-In-Part of U.S. patent application Ser. No. 15/273,646, filed on Sep. 22, 2016, which application is incorporated herein by reference in its entirety.

BACKGROUND OF THE INVENTION

1. Field of the Invention

The present invention relates to an Internet based age verification methodology for use during processing of age restricted e-commerce such as the purchase of tobacco or alcohol or gaining access to adult oriented web sites.

2. Background of the Prior Art

The Internet has fundamentally transformed the manner in which commerce is conducted. What once required a trip to the store, can now be accomplished with a few keystrokes on a computer via what is commonly called e-commerce and thereafter waiting for front door delivery. Find what you want, type in some personal information, make payment arrangements, such as via a credit card, a checking account, or a third-party payment transfer system, and the product is on the way via a delivery courier for products or the service can be immediately accessed via computer. The range of products that can be purchased in this manner is virtually unlimited, from toys, clothes, and food to home improvement products, life-saving medication and even vehicles. The market for services, such as book reading, premium content access, medical advice, game downloads, online wagering, etc., is configured in similar fashion.

One area of e-commerce that warrants special attention is age restricted commerce wherein a customer for a particular product or service must be of a certain minimum age to engage in such commerce. Alcohol, tobacco and tobacco alternate products and adult oriented web sites are all examples of where a customer needs to be of a threshold age in most jurisdictions in order to participate in such commerce. The question then becomes of how to verify the potential customer's age when the customer is initiating the transaction from a remote computer.

In a traditional transaction, the potential customer produces some form of identification, such as a driver's license, and the clerk checks the identification to ascertain whether the potential customer meets the age threshold required for the transaction and proceeds accordingly. However, in an online transaction, the face-to-face nature of a transaction is missing, yet the potential customer's age must still be verified.

A process is needed whereby a potential customer's age can be verified in an e-commerce transaction in order to ascertain whether or not the potential customer meets the minimum age threshold to prosecute the transaction. Such a system must be of such a nature so as to be of a relatively minor burden on the customer so as to not discourage properly aged customers from participating in the transaction. Such a system should rely on readily available technology.

SUMMARY OF THE INVENTION

The network-based age verification method of the present invention continues the advances that were made in patent application Ser. No. 15/273,646, referenced previously, and continues to address the aforementioned needs in the art by providing a system whereby a potential customer's age can be quickly and easily checked to ascertain whether or not the potential customer is age appropriate for the transaction. The network-based age verification method is a relatively simple subroutine in the overall e-commerce transaction and is not unduly burdensome from either a time or effort point of view for the customer. The network-based age verification method relies on common technology readily available to most customers wherein the needed technology is used in standard fashion so that neither undue delay or frustration is experienced.

The network-based age verification method comprises the steps of providing a client computer (laptop, desk top, tablet, cellphone etc.) that stores a first data set input by the customer. The first data set contains a first information data item and a first date data item. A merchant computer interacts with the client computer across a computer network and conducts a commerce transaction across the computer network such that the first data set is transmitted by the client computer to the merchant computer during the conduct of the commerce transaction. A verification computer controls a client database having a series of client records, each of the client records containing a second information item, a second date data item, and a first cellphone number. The merchant computer transmits a request to the verification computer across the computer network, the request containing the first data set. The verification computer receives the request transmitted by the merchant computer and processes the first information data item as a search key and uses the search key to search the client database. The verification computer compares the search key against the second information data item of the client records so that if the search key matches the second information item of one of the client records, the verification computer compares the first date data item to the second date data item of that client record and if the first date data item and the second date data item match, the commerce transaction is conditionally approved—the customer has been identified, the age information provided by the customer matches the date information in the client record, and the age of the customer so identified meets the threshold age set by the merchant for the particular transaction that the customer is trying to engage in. Otherwise, if the first date data item and the second date data item do not match each other (which can be due to the birthdate information in a matched record being null) or if the search key fails to match the second information data item of any of the client records, the verification computer searches a third-party database not under the control of the merchant computer, the third-party database having a series of third-party records each containing a third information data item, a third date data item, and a second cellphone number. The verification computer compares the search key against the third information data item of each of the third-party records so that if the verification computer determines that the search key matches the third information item of one of the third-party records, the first date data item is compared to the third date data item of that third record by the verification computer and if the first date data item matches the third date data item of that third-party record, the commerce transaction is conditionally approved. Otherwise if the first date data item and the third date data item do not match (which can be due to the birthdate information in a matched record being null) or if the search key fails to match the third information data item of any of the third-party records, the verification computer uploads, from the client computer via the computer network, a photo image data item input into the client computer via a camera communicatively coupled to the client computer, the photo image data item representing a form of identification, that has a photo image, a fourth information data item, and a fourth date data item such that the verification computer extracts the fourth information data item and the fourth date data item from the photo image data item using a computer vision system and compares the first information data item against the fourth information data item and compares the first date data item against the fourth date data item and if each comparison matches, the commerce transaction is fully approved and if at least one comparison does not match then the commerce transaction is denied. If the transaction is conditionally approved, the verification computer optionally sends an SMS code to either the first cellphone number if a client record generated the conditional approval or the second cellphone number if a third-party record generated the conditional approval respectively. The verification computer receives a numeric code (which can be from the cellphone to which the SMS code was sent or to the client computer conducting the transaction) and compares the numeric code against the SMS code and if the two match, the commerce transaction is finally approved, otherwise, the commerce transaction is denied. The final approval or the denial of the transaction is sent to the merchant computer by the verification computer across the computer network and the verification computer terminates its processing. The merchant computer receives the commerce transaction final approval or denial from the verification computer and continues processing the commerce transaction using the commerce transaction approval or denial as an input into the commerce transaction processing. The computer network is the Internet. The photo image data set is uploaded to the verification computer via the client computer which may be a handheld electronic device. The verification computer may send a prompt to the handheld electronic device prior to the step of uploading the photo image data set to the verification computer. The fourth information data item and the fourth date data item are each extracted from the photo image data set via a computer vision procedure under control of the verification computer. The photo image data set is displayed on a computer display device under control of the verification computer. The verification computer may request and be required to receive an electronic signature from the client computer prior to sending the final approval of the commerce transaction to the merchant computer. The system may also require the customer to, in addition to uploading a photo of their photo identification, upload a second image which is a selfie holding the same identification so that the computer vision system also compares the image of the identification in the first photo (the identification) and the second photo (the selfie of the customer holding the identification) to verify that the two match. The computer vision system also compares the person's image in the first photo against the facial image in the selfie to assure that the two faces are of the same person. If either of these comparisons do not match, the transaction is denied. The system may also prompt for a photo of the back of the identification so that the computer vision system reads the back (such as scanning the bar code or other code thereon) and verifies that the identification is genuine.

BRIEF DESCRIPTION OF THE DRAWINGS

Similar reference numerals refer to similar parts throughout the several views of the drawings.

DESCRIPTION OF THE PREFERRED EMBODIMENT

Figure 1:
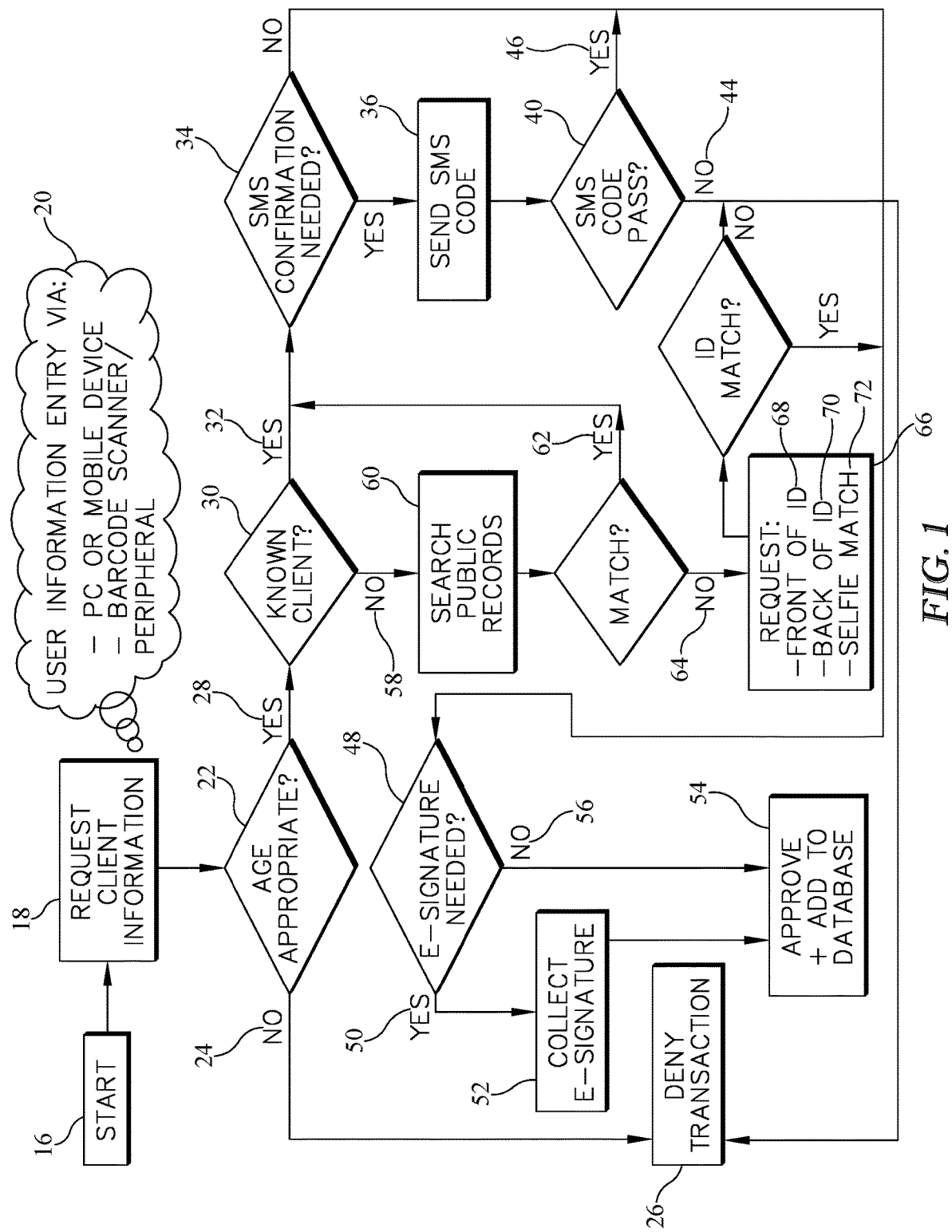
FIG. 1 is a flow chart schematic view of the network-based age verification method.
Figure 2:
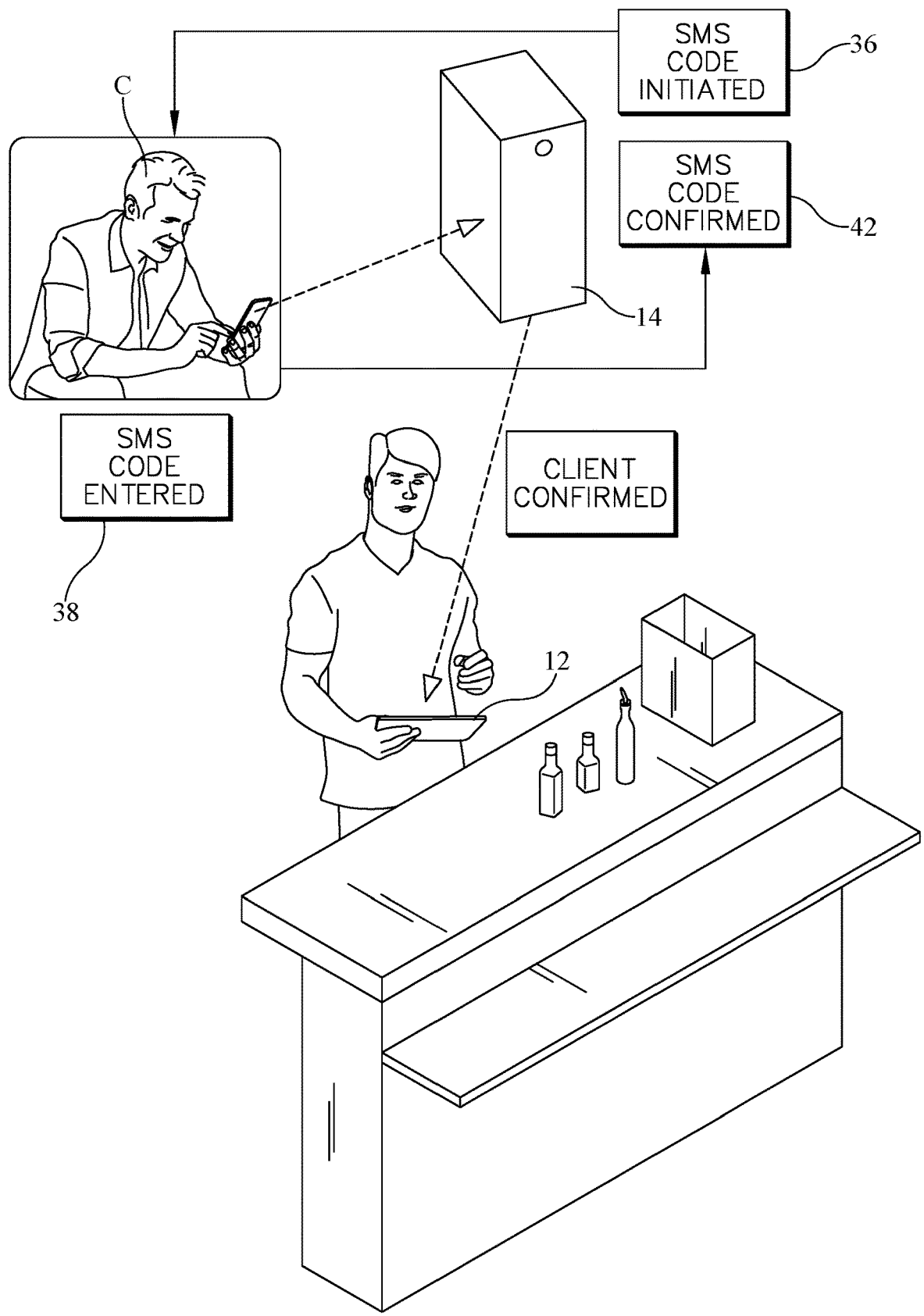
FIG. 2 is an environmental view of the network-based age verification method of the present invention being employed for a typical e-commerce transaction requiring an SMS code confirmation step.
Figure 3:
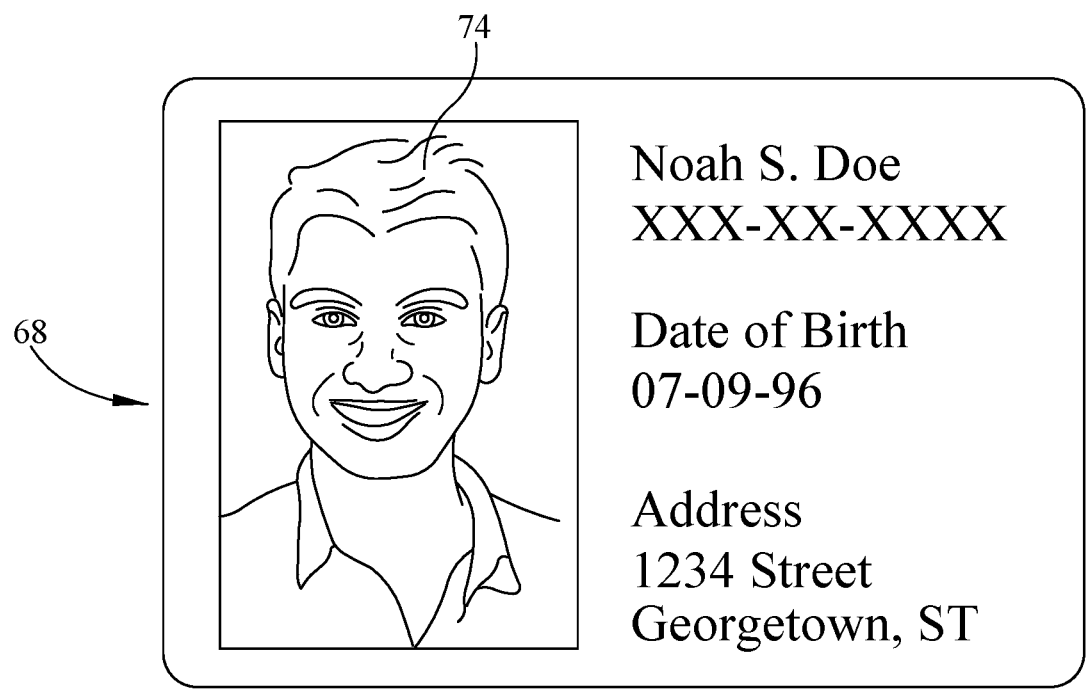
FIG. 3 illustrates an image of the front of an ID card.
Figure 4:
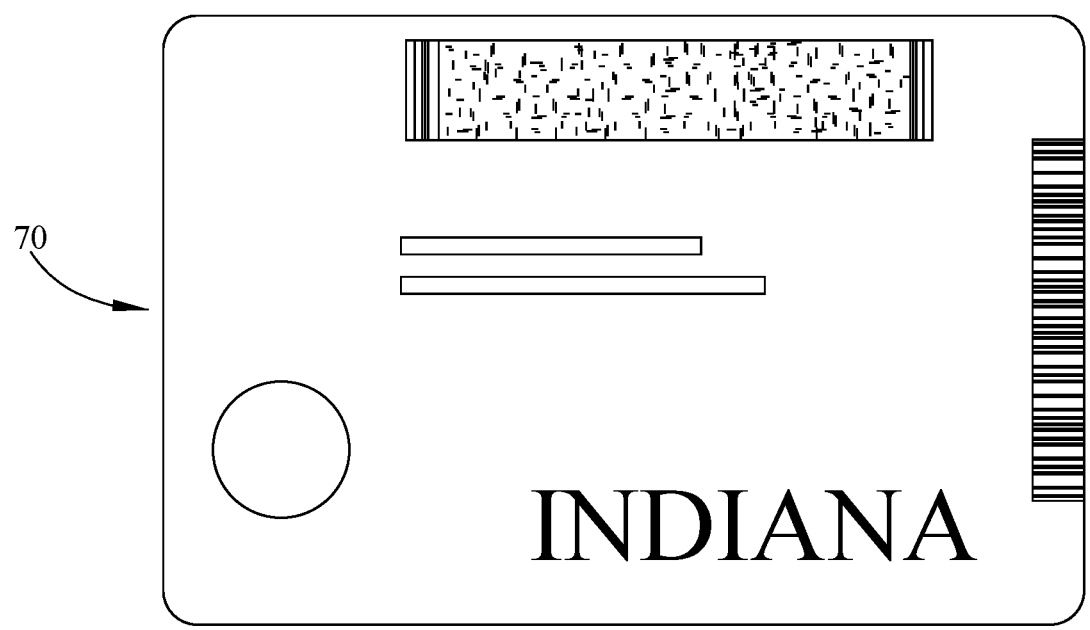
FIG. 4 illustrates an image of the back of an ID card.
Figure 5:
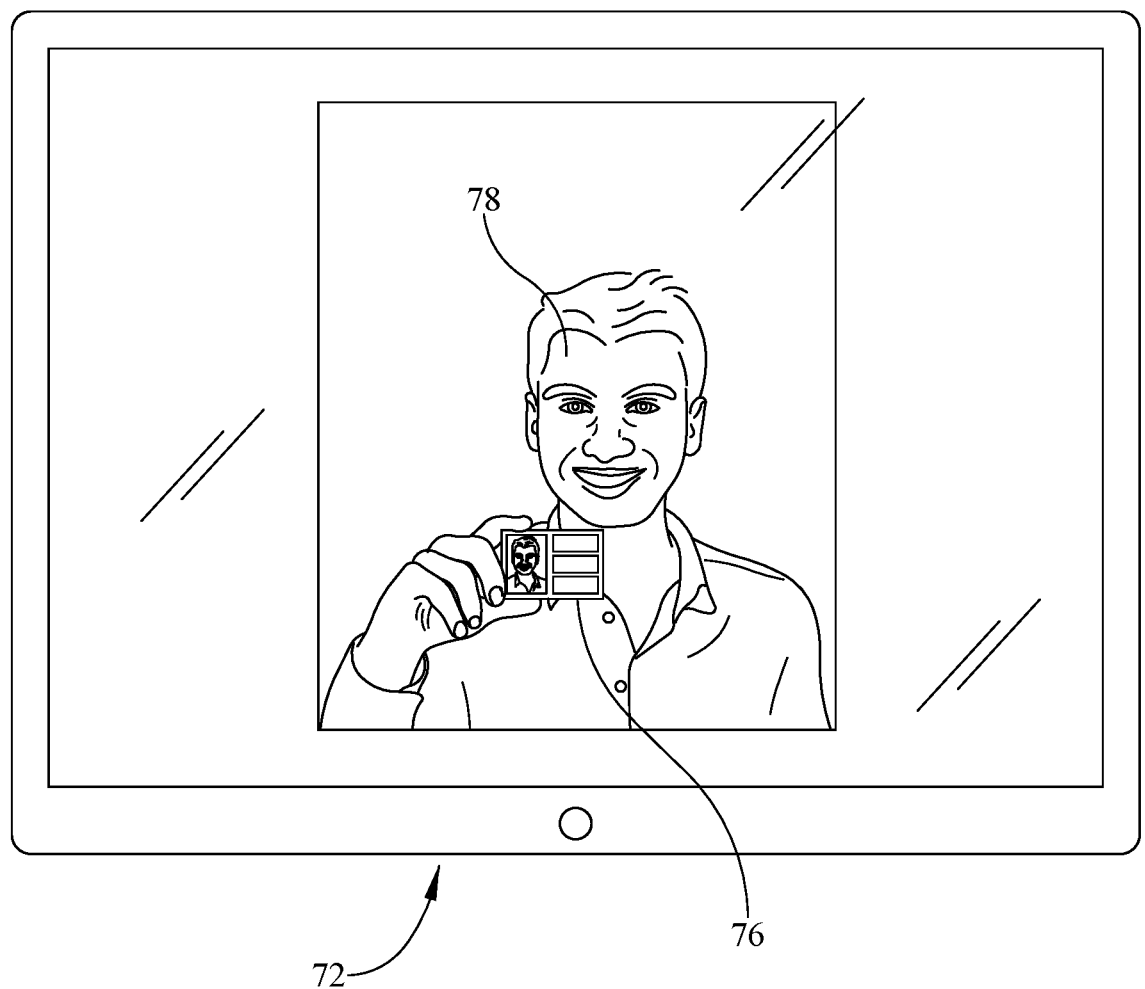
FIG. 5 illustrates a selfie with a person holding the ID card with the front of the ID card facing forward.

Referring now to the drawings, it is seen that the network-based age verification method of the present invention occurs in a typical e-commerce transaction occurring over the Internet, via an appropriate computation device, such as a desktop computer, laptop, computer tablet, smartphone 10, etc., which transaction is age restricted, such as the purchase of alcohol, tobacco or tobacco alternate products (e.g., vapes), certain medications, adult oriented website access, online wagering, financial transactions, other age restricted sites, etc. During the checkout process, when a merchant's computer determines that the transaction being prosecuted is age restricted, the merchant computer 12 calls the network-based age verification method, which resides on one or more computers 14 and the network-based age verification method is launched 16 and a separate window is opened during checkout. This separate window may either be a popup window or can be a window to which the customer is transferred during the checkout process. The customer is transferred to this new separate window at an appropriate point of the checkout process such as when the customer hits a "place order" or similar button wherein it appears that the customer is highly desirous of engaging in this particular transaction. If, the network-based age verification method is launched, it cannot be bypassed.

Once the network-based age verification method is launched 16, a series steps occur. First, the network-based age verification method requests information from the customer 18. Such information includes the customer's name, entered age (the age the customer claims to be), and the customer's address including zip code—other information, such as a cellphone number and e-mail address can also be gathered. This request for client information can be either requested from the customer whenever the separate window is opened, or can be automatically copied from the order placement window without further request for input from the customer or can be a combination thereof—for example, the customer may not be prompted for age information until the network-based age verification method is launched so that the customer is prompted only for this additional information upon network-based age verification method launch, this being so that that a customer is not prompted for sensitive age related information if the transaction does not involve age sensitive products or services. The information is entered in appropriate format 20, such as manually inputting the information in typical fashion via the customer's electronic device (general computer, tablet, cellphone, etc.). Alternately, if the user has identification that can be scanned and has the appropriate scanning hardware and/or software, the user can scan their identification and the extracted relevant information is uploaded to the network-based age verification method.

Initially, the network-based age verification method determines whether the customer meets the minimum threshold age for the transaction 22, based on the information provided by the customer. If the customer does not meet the minimum threshold age 24 for the particular transaction in the particular jurisdiction whereat the customer resides, the transaction is denied 26, and the network-based age verification method terminates by transmitting to the merchant's computer an appropriate denial of transaction signal for further processing by the merchant computer.

If the customer's inputted data shows that the customer is of the appropriate age for the transaction 28, then the network-based age verification method determines whether the customer is a known client 30 and has been previously age verified. The information entered by the customer is verified against stored information on a client database controlled or otherwise accessible by the network-based age verification method. If a match is found within the client database 32, including the date of birth within the found record(s) matching the date of birth provided by the customer, then the transaction proceeds to an optional next step, namely determine whether an SMS confirmation step is needed 34. The optional SMS confirmation step 34 is used to prevent potential customers from using the credentials of others for age verification, such as a parent, that might be known within the merchant's computer and thus have a client record. If a potential customer uses another's credentials, the SMS confirmation step 34 ferrets this out by sending an SMS code to the cellphone number of the actual person who possesses the particular credentials, this cellphone number being in the matched client record located within the client database. Each merchant using the network-based age verification method determines whether the optional SMS confirmation code 34 is initiated for their transactions or possibly for a subset of their transactions based on user definable criteria.

In this optional SMS confirmation step, an SMS code is initiated 36 by the network-based age verification method and sent to the customer's cellphone number found within the known client records just searched, an appropriate enter box is provided to the customer C for entry of the received SMS code. Once the customer C receives the SMS code, they enter the code into the appropriate box 38 and thereafter transmit the code back to the network-based age verification method where the SMS code is verified 40 and the client is confirmed 42.

If the client is not confirmed during this SMS step, either by not entering the correct code (possibly after allowing one or more makeup attempts to account for typos) or the customer C does not enter any SMS code after an appropriate timeout period, then the SMS code step is not passed 44, the transaction is denied 26, and the network-based age verification method terminates by transmitting to the merchant's computer an appropriate denial of transaction signal for further processing by the merchant computer.

If the SMS code step is passed 46 (SMS code properly entered by the customer), then the network-based age verification method proceeds to an optional next step, namely collecting an e-signature 48 for the particular transaction, the need for this step being determined by the merchant. If an e-signature is needed 50, then an appropriate prompt box appears on the customer's computer 10 with appropriate instructions, the customer enters their e-signature 52, and the transaction is approved 54 and an appropriate approval of transaction signal is transmitted to the merchant computer 12. Along with transaction approval, the customer's information is added to the network-based age verification method database so that that particular customer can be subsequently identified as a known client. If an e-signature is not required 56, then the network-based age verification method proceeds direct to the transaction approval step 54. The e-signature collection 48 is used when either a merchant wants additional verification from a customer or in jurisdictions that may require an e-signature for certain transactions. The e-signature collection step 48 is optional for a given merchant and may be filtered by the merchant, so for example, only customers having a delivery address in a particular set of zip codes are required to enter an e-signature. The transaction will not complete and an approval of transaction signal will not be issued by the network-based age verification method until the e-signature is collected when this optional step is initiated.

If after the step of searching to determine whether the customer is a known client 30 and a match is not made 58 or the compared dates do not match, then a search of public records 60 is performed, such public records being available data on the Internet such as via any appropriate third-party database. Appropriate search and data mining algorithms are used and may have the ability to account for slight variations in the spelling of the person's name or address as input. The input into this public records search 60 is from the information 18 gathered from the customer. If the information from the customer is matched 62 from the public records search 60 and the public records provide an affirmative age (if date of birth is found, an appropriate calculation is made) and the age meets the minimum threshold level, then the transaction proceeds to an optional next step, namely determine whether an SMS confirmation step is needed 34 as noted above and proceeds as above including taking the optional e-signature collection step 48 if the customer is confirmed 42 during the SMS code confirmation step 34—if the SMS confirmation step is not needed, the collection an e-signature may still be required.

If a match is not made 64 when performing the search public records step 60 or if a match is found but determined that the information available from this find is insufficient to verify the customer's age (insufficient age information found or age information does not match age information input by the customer), then the customer C is prompted to provide photo identification 66 such as a driver's license or other government issued ID. The customer C is prompted to provide a photo of the front of the identification 68, the rear of the identification 70 (this optimal step is used to ferret out phony ID cards in that the back of a typical driver's license or even military identification has certain codes thereon to verify its authenticity—if the network-based age verification method is configured for a particular merchant to undertake this optional step of requesting the back of the identification card is employed, then the network-based age verification method determines when not to initiate this optional step, such as when the customer C uploads a photo of a passport which is self-authenticating with the single image). The customer C is also prompted to provide a selfie 72 of the customer holding the identification provided. The customer C can either input the images requested via the camera on his or her computer 10, or a text message can be sent to the potential customer's smartphone (which may or not be the computer conducting the e-commerce with the merchant), which text message has an appropriate URL that allows the customer to open the URL and use the customer's smartphone 10 to snap the requested images via the smartphone's camera and then have the images automatically transferred to the verification computer. The images are uploaded by the customer C and transmitted to the network-based age verification method via the Internet in appropriate fashion. The uploaded image of the front of the photo identification 68 is then scan by a computer vision system for font readable information and the information so read is then compared against the information provided by the customer 18. If the information on the image of the front of the photo identification 68 matches the information provided by the customer C, then the network-based age verification method optionally verifies if the identification is genuine via the photo of the back of the identification. This is typically done by having the computer vision system scan the bar code 78 or other coding on the back and comparing the scan against the appropriate government database. Thereafter, the network-based age verification method compares the image 74 of the front of the photo identification 68 with the photo of the identification 76 within the selfie 72 to verify that the two are the same item of identification. Thereafter, the network-based age verification method compares the facial image of the customer 78 within the selfie 72 against the image of the person within the photo identification to assure that the person holding the identification is in fact the same person identified by the identification.

The image of the front of the photo identification 68 of the customer C is checked automatically via a scan by a computer vision system—an appropriate software program that is known in the art to extract information including name, address and the date of birth therefrom (with appropriate calculation if needed) and is also capable of facial recognition. Similarly, the computer vision system checks the image of the back of the identification 70 (if this step is used) and verifies it against known parameters of valid identification cards. Additionally, the computer vision system scans the selfie 72 and verifies that the image of the person 78 within the selfie 72 is the person in the photo of the front of the photo identification 68.—Of course, these steps can performed manually, so that an operator of the network-based age verification method receives a display of the images on an appropriate computer screen and visually checks for the date of birth and inputs the date of birth into the network-based age verification method in appropriate fashion as well as the back of the identification as well as checking the selfie 72 to assure that the person in the selfie 72 matches the person in the identification photo.

If customer successfully passes the providing of photo identification step 66 and is determined to meet the age threshold, then the transaction may proceed to the optional e-signature collection step 48 if the customer is confirmed 42 during the SMS code confirmation step 34, there being no need to proceed to the optional SMS code confirmation step.

If the customer does not pass the providing of photo identification step 66 for any reason (failure to upload one or more requested images, information extracted from the front of photo identification 68 shows the customer is below minimum age, the image of the back of the photo identification 70 does not validate the identification as being valid, the image of the person 78 within the selfie 72, does not match the image of the person within the identification, etc.), the transaction is denied 26, and the network-based age verification method terminates by transmitting to the merchant's computer an appropriate denial of transaction signal for further processing by the merchant computer.

In either case, the actual images of the photo identification, if provided, are not saved.

If the transaction is approved, a unique reference number is generated and supplied to the merchant, and possibly placed on the invoice of the customer, so that appropriate tracking of the transaction can occur if required.

Each merchant utilizing the network-based age verification method has a unique token or identification when interacting with the network-based age verification method.

While the invention has been particularly shown and described with reference to an embodiment thereof, it will be appreciated by those skilled in the art that various changes in form and detail may be made without departing from the spirit and scope of the invention.

We claim:

1. A method for information confirmation comprising the steps of:

a client computer stores a first data set, the first data set containing a first information data item and a first date data item;

a merchant computer interacts with the client computer across a computer network and conducts a commerce transaction across the computer network such that the first data set is provided by the client computer to the merchant computer during the conduct of the commerce transaction;

a verification computer controls a client database having a series of client records, each of the client records containing a second information item, a second date data item, and a first cellphone number;

the merchant computer transmits a request to the verification computer across the computer network, the request containing the first data set;

the verification computer receives the request transmitted by the merchant computer and processes the first information data item as a search key and uses the search key to search the client database;

the verification computer compares the search key against the second information data item of the client records so that if the search key matches the second information item of one of the client records, the verification computer compares the first date data item to the second date data item of that client record and if the first date data item and the second date data item match, the commerce transaction is conditionally approved;

otherwise if the first date data item and the second date data item do not match each other or the search key does not match the second information data item of any of the client records, the verification computer searches a third-party data base not under the control of the merchant computer, the third-party database having a series of third-party records containing a third information data item, a third date data item, and a second cellphone number such that the verification computer compares the search against the third information data item of each of the third-party records so that if the verification computer determines that the first information data item matches the third information item of one of the third-party records, the first date data item is compared to the third date data item of that third record by the verification computer and if the first date data item matches the third date data item of that third-party record, the commerce transaction is conditionally approved;

otherwise if the first date data item and the third date data item do not match or the search key does not match the third information data item of any of the third-party records, the verification computer uploads, from the client computer via the computer network, a photo image data item input into the client computer via a camera communicatively coupled to the client computer, the photo image data item, representing a form of identification that has a photo image, a fourth information data item, and a fourth date data item thereon, such that the verification computer extracts the fourth information data item and the fourth date data item from the photo image data item using a computer vision system and compares the first information data item against the fourth information data item and compares the first date data item against the fourth date data item and if each comparison matches, the commerce transaction is finally approved and if at least one comparison does not match then the commerce transaction is denied;

if the transaction is conditionally approved, the verification computer sends an SMS code to either the first cellphone number if a client record generated the conditional approval or the second cellphone number if a third-party record generated the conditional approval;

the verification receives a numeric code and compares the numeric code against the SMS code and if the two match, the commerce transaction is finally approved, otherwise, the commerce transaction is denied;

the final approval or the denial is sent to the merchant computer by the verification computer across the computer network and the verification computer terminates its processing; and the merchant computer receives the commerce transaction final approval or denial from the verification computer and continues processing the commerce transaction using the commerce transaction approval or denial as an input into the commerce transaction processing.

2. The method for information confirmation as in claim 1 wherein the computer network is the Internet.

3. The method for information confirmation as in claim 1 wherein the photo image data set is uploaded to the verification computer via the client computer.

4. The method for information confirmation as in claim 1 wherein the photo image data set is uploaded to the verification computer via a handheld electronic device.

5. The method for information confirmation as in claim 1 wherein the verification computer sends a prompt to the handheld electronic device prior to the step of uploading the photo image data set to the verification computer.

6. The method for information confirmation as in claim 5 wherein the fourth information data item and the fourth date data item are each extracted from the photo image data set via a computer vision procedure under control of the verification computer.

7. The method for information confirmation as in claim 1 wherein the photo image data set is displayed on a computer display device under control of the verification computer.

8. The method for information confirmation as in claim 1 further comprising the step of the verification computer receiving an electronic signature from the client computer prior to sending the final approval of the commerce transaction to the merchant computer.

9. A method for information confirmation comprising the steps of:

a client computer stores a first data set, the first data set containing a first information data item and a first date data item;

a merchant computer interacts with the client computer across a computer network and conducts a commerce transaction across the computer network such that the first data set is provided by the client computer to the merchant computer during the conduct of the commerce transaction;

a verification computer controls a client database having a series of client records, each of the client records containing a second information item and a second date data item;

the merchant computer transmits a request to the verification computer across the computer network, the request containing the first data set;

the verification computer receives the request transmitted by the merchant computer and processes the first information data item as a search key and uses the search key to search the client database;

the verification computer compares the search key against the second information data item of the client records so that if the search key matches the second information item of one of the client records, the verification computer compares the first date data item to the second date data item of that client record and if the first date data item and the second date data item match, the commerce transaction is approved and the approval is transmitted to the merchant computer by the verification computer and the verification computer terminates its processing;

otherwise if the first date data item and the second date data item do not match each other or the search key does not match the second information data item of any of the client records, the verification computer searches a third-party data base not under the control of the merchant computer, the third-party database having a series of third-party records containing a third information data item and a third date data item such that the verification computer compares the search key against the third information data item of each of the third-party records so that if the verification computer determines that the search key matches the third information item of one of the third-party records, the first date data item is compared to the third date data item of that third record by the verification computer and if the first date data item matches the third date data item of that third-party record, the commerce transaction is approved and the approval is sent to the merchant computer by the verification computer and the verification computer terminates its processing;

otherwise if the first date data item and the third date data item do not match or the search key does not match the third information data item of any of the third-party records, the verification computer uploads, from the client computer via the computer network, a first photo image data item and a second photo image data item, each input into the client computer via a camera communicatively coupled to the client computer, the first photo image data item representing a first form of identification, that has a photo image, a fourth information data item, and a fourth date data item, the second photo image data item representing a selfie with a human showing their facial image and holding a second form of identification, such that the verification computer extracts the fourth information data item and the fourth date data item from the photo image data item using a computer vision system and compares the first information data item against the fourth information data item and compares the first date data item against the fourth date data item and compares the first form of identification against the second form of identification, and also compares the photo image against the facial image and if each comparison matches, the commerce transaction is approved and the approval is sent to the merchant computer by the verification computer and if at least one comparison does not match then the commerce transaction is denied and the denial is sent to the merchant computer by the verification computer across the computer network and the verification computer terminates its processing; and the merchant computer receives the commerce transaction approval or denial from the verification computer and continues processing the commerce transaction using the commerce transaction approval or denial as an input into the commerce transaction processing.

10. The method for information confirmation as in claim 9 wherein the computer network is the Internet.

11. The method for information confirmation as in claim 9 wherein the first photo image data item and the second photo image data item are each uploaded to the verification computer via the client computer.

12. The method for information confirmation as in claim 9 wherein the first photo image data item and the second photo image data item are each uploaded to the verification computer via a handheld electronic device.

13. The method for information confirmation as in claim 12 wherein the verification computer sends a prompt to the handheld electronic device prior to the step of uploading the photo image data item and the second photo image data item to the verification computer.

14. The method for information confirmation as in claim 9 wherein the fourth information data item and the fourth date data item are each extracted from the first photo image data set via a computer vision procedure under control of the verification computer.

15. The method for information confirmation as in claim 9 wherein the first photo image data set is displayed on a computer display device under control of the verification computer.

16. The method for information confirmation as in claim 9 further comprising the step of the verification computer receiving an electronic signature from the client computer prior to sending the approval of the commerce transaction to the merchant computer.

17. The method for information confirmation as in claim 9 further comprising the step the verification computer uploading, from the client computer via the computer network, a third photo image data item, input into the client computer via a camera communicatively coupled to the client computer, immediately before or after the step of uploading the second photo image data set, the third photo image data item representing a back side of the first form of identification such that the computer vision system scans the third photo data image set to determine if the first form of identification is not genuine and if it so determines, the transaction is denied.

* * * * *